US005732600A

United States Patent [19]
Peterson et al.

[11] Patent Number: 5,732,600
[45] Date of Patent: Mar. 31, 1998

[54] SHAFT ASSEMBLY FOR USE IN STEERING SYSTEMS

[75] Inventors: Philip S. Peterson; John A. Budzik, both of Lafayette, Ind.

[73] Assignee: TRW Inc., Lyndhurst, Ohio

[21] Appl. No.: 498,951

[22] Filed: Jul. 6, 1995

[51] Int. Cl.$^6$ .................. B62D 1/18; F16D 3/06
[52] U.S. Cl. .......... 74/492; 180/89.12; 280/775; 296/190; 403/13; 403/378; 411/24; 411/55
[58] Field of Search .............. 74/492; 180/89.12, 180/89.13; 280/775; 296/190; 403/13, 14, 277, 279, 294, 375, 376, 378, 379; 411/24, 26, 44, 55

[56] References Cited

U.S. PATENT DOCUMENTS

| | | | |
|---|---|---|---|
| 1,861,814 | 6/1932 | Peters | 403/379 |
| 2,865,222 | 12/1958 | Bachman | 280/775 |
| 2,872,227 | 2/1959 | Wachs | 411/24 |
| 2,937,881 | 5/1960 | Norrie . | |
| 3,580,101 | 5/1971 | Jorgensen et al. . | |
| 3,701,393 | 10/1972 | Lemons et al. | 180/89.12 |
| 3,741,032 | 6/1973 | Baker . | |
| 4,452,329 | 6/1984 | Stone et al. | 296/190 X |
| 4,638,878 | 1/1987 | Komp | 180/89.13 |
| 4,722,241 | 2/1988 | Yoshida et al. . | |
| 4,856,927 | 8/1989 | Cusati | 403/379 X |
| 4,921,367 | 5/1990 | Everett, II et al. . | |
| 5,090,834 | 2/1992 | Yamamoto | 403/277 |
| 5,366,316 | 11/1994 | Cymbal | 403/378 |

FOREIGN PATENT DOCUMENTS 2273969 7/1994 United Kingdom ............ 74/492

*Primary Examiner*—Rodney H. Bonck
*Assistant Examiner*—Troy Grabow
*Attorney, Agent, or Firm*—Tarolli, Sundheim, Covell, Tummino & Szabo

[57] ABSTRACT

A vehicle (10) has a steering gear (26) connected with a frame (12) to turn steerable vehicle wheels (14). A body (16) of the vehicle (10) is resiliently mounted on the frame (12). A steering wheel (28) is connected with the body (16) of the vehicle and is rotatable to actuate the steering gear (26). An improved shaft assembly (38) is utilized to transmit force between the steering gear (26) and the steering wheel (28). The shaft assembly (38) is connected with the steering wheel (28) through an upper universal joint (40). The shaft assembly (38) is connected with the steering gear (26) through a lower universal joint (42). The shaft assembly (38) includes a variable length portion (46) having upper and lower sections (48 and 52) which are disposed in a telescopic relationship. A connector assembly (54) interconnects an extension section (50) with the variable length portion (46) of a shaft assembly (38) when the upper and lower universal joints (40 and 42) are in a predetermined relationship. The variable length portion (46) of the shaft assembly (38) accommodates relative movement between the steering wheel (28) and the steering gear (26). The connector assembly (54) includes a sleeve (152) which is plastically deformed to maintain a connection between the variable length portion (46) of the shaft assembly (38) and the extension section (50) of the shaft assembly.

11 Claims, 4 Drawing Sheets

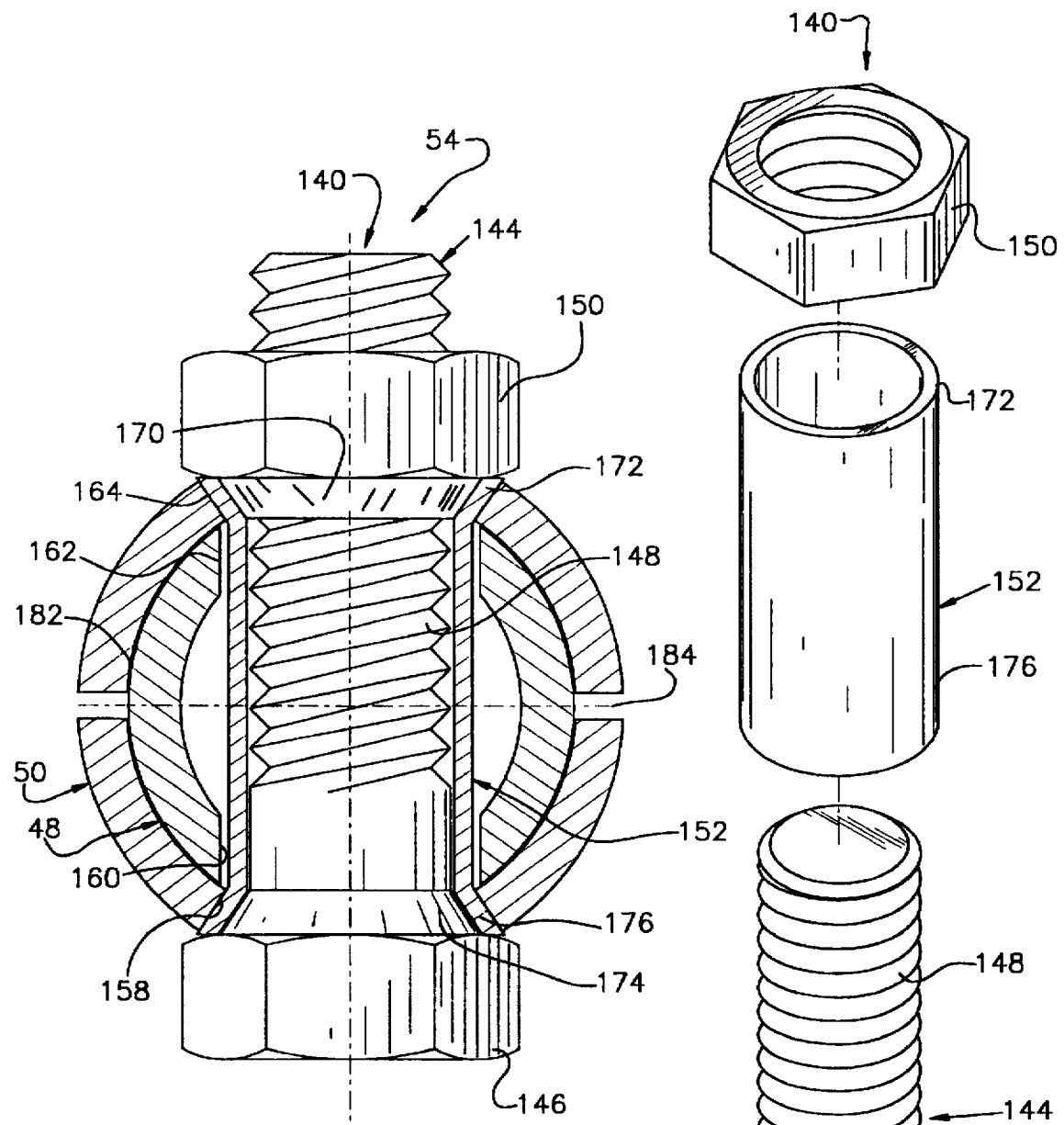

5,732,600

1

SHAFT ASSEMBLY FOR USE IN STEERING SYSTEMS

BACKGROUND OF THE INVENTION

The present invention relates to an apparatus for use in transmitting force between a steering gear which is mounted on a base of a vehicle and is operable to turn steerable vehicle wheels and a steering wheel which is disposed in a passenger compartment of the vehicle.

A known apparatus for use in transmitting force between a steering gear which is mounted on the base of a vehicle and a steering wheel which is disposed in a passenger compartment of the vehicle is disclosed in U.S. Pat. No. 2,937,881 issued May 24, 1960. This apparatus includes a shaft assembly which is connected with the steering wheel and the steering gear by universal joints at opposite ends of the shaft assembly. The length of the shaft assembly is variable to accommodate relative movement between steering gear and the steering wheel.

When vehicles having shaft assemblies with this known construction are to be assembled, one end of the shaft assembly is connected with the steering gear on the frame of the vehicle. The opposite end of the shaft assembly is connected with the steering wheel of the vehicle while the body and frame of the vehicle are a substantial distance apart. During assembly of the vehicle, the body is moved downward onto the frame of the vehicle. The portion of the shaft assembly connected with the steering gear and the portion of the shaft assembly connected with the steering wheel are then interconnected in a telescopic relationship.

When the portions of the shaft assembly are interconnected, it is possible to have the universal joints in an out-of-phase relationship. Thus, the universal joints may be assembled with a yoke member connected with one end of the shaft assembly skewed at an acute angle relative to a yoke member at the opposite end of the shaft assembly.

SUMMARY OF THE INVENTION

The present invention provides a new and improved apparatus for use in transmitting force between a steering gear which is mounted on a base of a vehicle and a steering wheel which is disposed in a passenger compartment. The apparatus includes a lower universal joint which is connected with the steering gear. An upper universal joint is connected with the steering wheel. A shaft assembly extends between the upper and lower universal joints. The shaft assembly includes a variable length portion and an extension section. The variable length portion and extension section of the shaft assembly are interconnected by a connector assembly.

The variable length portion of the shaft assembly may include upper and lower sections which are disposed in a telescopic relationship and are connected with one of the universal joints. The extent of the telescopic relationship between the upper and lower sections can be varied to vary the length of the shaft assembly.

The connector assembly connects the extension section with the variable length portion of the shaft assembly. The connector assembly allows the extension section and variable length portion of the shaft assembly to be interconnected only when the upper and lower universal joints are in a desired orientation relative to each other.

The connector assembly may include a sleeve. The sleeve is plastically deformed to maintain a connection between the extension section and the variable length portion of the shaft

2 assembly in the event that, for some unforeseen reason, a fastener interconnecting the extension section and the variable length portion of the shaft assembly becomes disconnected.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is an enlarged exploded illustration of a fastener assembly which is used to interconnect the sections of the shaft assembly of FIG. 3; and FIG. 5 is an enlarged sectional view, taken generally along the line 5—5 of FIG. 2, illustrating the manner in which the fastener assembly of FIG. 4 is used to interconnect the sections of the shaft assembly.

DESCRIPTION OF ONE SPECIFIC PREFERRED EMBODIMENT OF THE INVENTION

General Description

Figure 1:
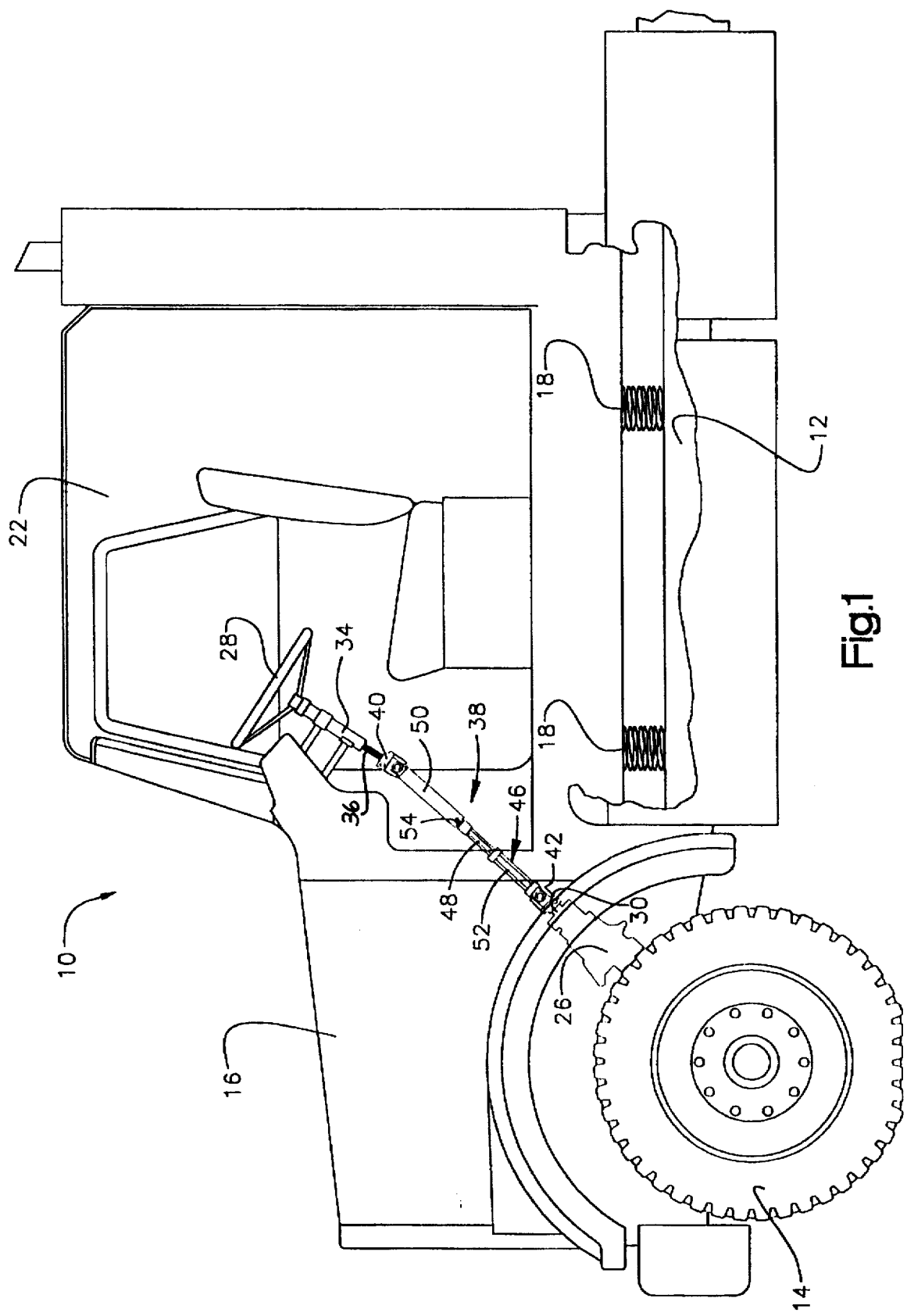
FIG. 1 is a schematic illustration of a vehicle having a variable length shaft assembly through which force is transmitted between a steering wheel and a steering gear.

A vehicle 10 (FIG. 1) includes a base or frame 12 which is partially supported by steerable vehicle wheels 14. A body 16 is connected with the frame 12 by resilient connections 18 which have been indicated schematically in FIG. 1. The resilient connections 18 at least partially isolate a passenger compartment 22 in the body 16 of the vehicle 10 from vibration during operation of the vehicle. However, the resilient connections 18 enable the body 16 of the vehicle 10 to move relative to the frame 12 during operation of the vehicle.

The steerable vehicle wheels 14 are turned by steering gear 26 mounted on the frame 12 in response to rotation of a steering wheel 28 in the passenger compartment 22. The steering gear 26 is of the well known integral type and has a construction similar to that disclosed in U.S. Pat. No. 3,741,032 issued Jun. 26, 1973 and U.S. Pat. No. 4,872,393 issued Oct. 10, 1989. However, it is contemplated that the steering gear 26 could have a construction which is different than the construction of an integral steering gear. For example, the steering gear 26 could have the construction which is similar to the construction of the steering gear illustrated in U.S. Pat. No. 4,418,781 issued Dec. 6, 1983 or in U.S. Pat. No. 5,213,175 issued May 25, 1993. Regardless of the specific construction of the steering gear 26, upon rotation of an input shaft 30 to the steering gear, steerable vehicle wheels 14 are turned relative to the base or frame 12.

The steering wheel 28 is rotatably supported in the passenger compartment 22 by a steering column 34. In the illustrated embodiment of the invention, the steering column 34 is fixedly connected with the body 16 of the vehicle 10. Therefore, the steering column 34 supports the steering wheel 28 in a predetermined position in the passenger compartment 22. The steering column 34 has a rotatable output shaft 36.

The steering column 34 is of the fixed type and may have a construction similar to that disclosed in U.S. Pat. No. 3,791,182 issued Feb. 12, 1974. However, the steering column 34 could be of the tilt and/or telescope type if desired. For example, the steering column 34 could have a construction similar to the construction disclosed in U.S. Pat. No. 4,753,121 issued Jun. 28, 1988 or in U.S. Pat. No. 4,976,167 issued Dec. 11, 1990.

A variable length shaft assembly 38 (FIG. 1) is constructed in accordance with the present invention and extends between a lower universal joint 42 connected with the steering gear input shaft 30 and an upper universal joint 40 connected with the steering column output shaft 36. The shaft assembly 38 is rotatable to transmit force from the steering wheel 28 to the steering gear 26 upon rotation of the steering wheel. The force transmitted through the shaft assembly 38 effects actuation of the steering gear 26 to turn the steerable vehicle wheels 14.

The shaft assembly 38 includes a variable length portion 46 which accommodates relative movement between the body 16 and base 12 of the vehicle 10. The variable length portion 46 includes a tubular upper section 48. The upper section 48 of the variable length portion 46 is connected with the upper universal joint 40 through a cylindrical tubular extension section 50. A lower section 52 of the variable length portion 46 is connected with the lower universal joint 42. The tubular upper and lower sections 48 and 52 of the variable length portion 46 are disposed in a coaxial telescopic relationship with each other. By varying the extent of the telescopic relationship between the upper and lower sections 48 and 52, the length of the shaft assembly 38 can be varied.

The variable length portion 46 (FIG. 1) of the shaft assembly 38 is connected with the extension section 50 of the shaft assembly by a connector assembly 54. The connector assembly 54 is constructed so as to permit the extension section 50 of the shaft assembly 38 to be connected with the variable length portion 46 of the shaft assembly only when the upper and lower universal joints 40 and 42 are in predetermined orientations relative to each other. The connector assembly 54 enables the variable length portion 46 of the shaft assembly 38 to be connected with the extension section 50 of the shaft assembly only when a portion of the lower universal joint 42 is pivotal about an axis which extends parallel to an axis about which a portion of the upper universal joint 40 is pivotal. If desired, the universal joints 40 and 42 could have a different orientation relative to each other when the variable length portion 46 is connected with the extension section 50 of the shaft assembly 38.

In the embodiment of the invention illustrated in FIG. 1, the variable length portion 46 of the shaft assembly 38 is connected with the steering gear 26 by the lower universal joint 42 and the extension section 50 is connected with the steering column 34 by the upper universal joint 40. However, if desired, the variable length portion 46 of the shaft assembly 38 could be connected with the steering column 34 by the upper universal joint 40 and the extension section 50 could be connected with the steering gear 26 by the lower universal joint 42.

Universal Joints

The upper universal joint 40 (FIG. 1) interconnects the shaft assembly 38 and the steering column 34. The upper universal joint 40 is what is commonly referred to as a Hooke's universal joint having a gimbaled construction. The upper universal joint 40 includes an output yoke member 60 (FIG. 2) which is fixedly connected to an upper end portion 62 of the extension section 50. An input yoke member 64 is fixedly connected with the output shaft 36 of the steering column 34. A right angle cross member 66 (FIG. 2) is connected with the output yoke member 60 and the input yoke member 64.

Figure 2:
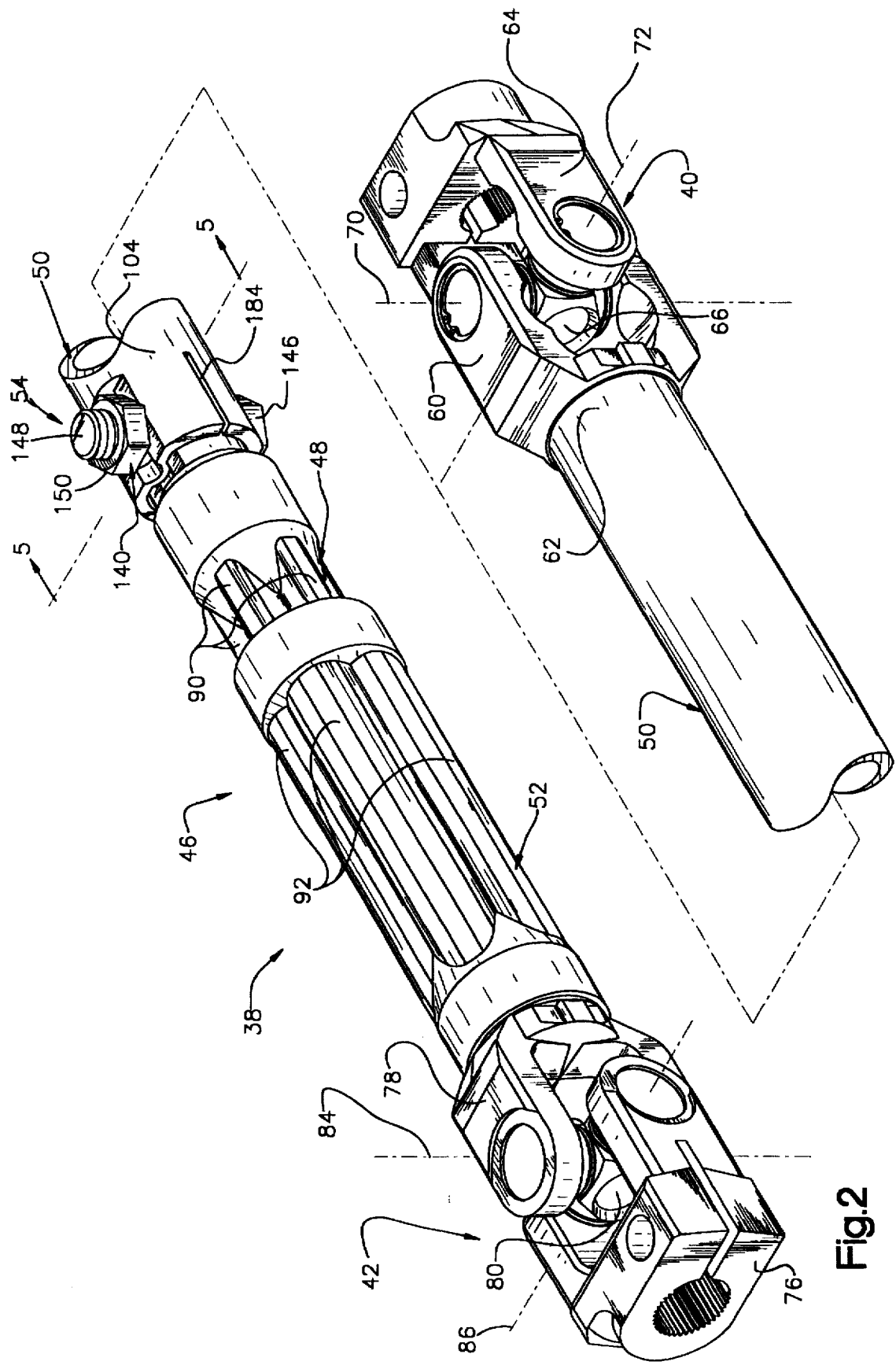
FIG. 2 is an enlarged fragmentary illustration of the shaft assembly.

The cross member 66 enables pivotal movement to occur about orthogonal axes 70 and 72 (FIG. 2). Thus, the output yoke member 60 is pivotal relative to the cross member 66 about the axis 70. The cross member 66 is pivotal relative to the input yoke member 64 about the axis 72. The axis 72 extends perpendicular to the axis 70 and to an axis about which the output shaft 36 (FIG. 1) of the steering column 34 is rotatable. The axis about which the input yoke member 64 of the upper universal joint 40 and the output shaft 36 of the steering column 34 rotate is fixed relative to the body 16 of the vehicle 10.

The lower universal joint 42 (FIG. 1) interconnects the steering gear 26 and shaft assembly 38. The lower universal joint 42 is of the type which is commonly referred to as a Hooke's universal joint and has a gimbaled construction. The lower universal joint 42 includes an output yoke member 76 (FIG. 2) which is fixedly connected to the input shaft 30 of the steering gear 26. An input yoke member 78 is fixedly connected with the shaft assembly 38. A right angle cross member 80 interconnects the output yoke member 76 and the input yoke member 78.

The cross member 80 enables pivotal movement to occur about orthogonal axes 84 and 86. Thus, the input yoke member 78 is pivotal relative to the cross member 80 about the axis 84. The cross member 80 is pivotal relative to the output yoke member 76 about the axis 86. The axis 86 extends perpendicular to the axis 84 and to a longitudinal central axis of the input shaft 30 of the steering gear 26.

In the illustrated embodiment of the invention, the steering column 34 (FIG. 1) is fixedly connected with the body 16 so that the axis about which the output shaft 36 and input yoke member 64 rotate remains stationary relative to the body 16. Of course, if the steering column 34 was of the tilt type, the orientation of the axis about which the input yoke member 64 rotates could be varied relative to the body 16 of the vehicle 10 upon adjustment of the position of the steering column 34 relative to the passenger compartment 22.

Variable Length Portion of Shaft Assembly

The variable length portion 46 (FIG. 2) of the shaft assembly includes the first or upper section 48. The upper section 48 is fixedly secured to the extension section 50 by the connector assembly 54. The variable length portion 46 also includes the second or lower section 52. The lower section 52 is fixedly connected with the input yoke member 78 of the lower universal joint 42. The upper and lower sections 48 and 52 have coincident longitudinal central axes.

The upper and lower sections 48 and 52 are disposed in a telescopic relationship with each other. Varying the extent of the telescopic relationship between the upper section 48 and lower section 52 enables the shaft assembly 38 to accommodate relative movement between the body 16 and frame 12 of the vehicle 10. In the illustrated embodiment of the invention, the upper section 48 telescopes into the lower section 52. Of course, the variable length portion 46 could be constructed in a manner in which the lower section 52 telescopes into the upper section 48 if desired.

The upper and lower sections 48 and 52 are interconnected so as to transmit rotational force between the lower universal joint 42 and the extension section 50 of the shaft assembly 38. Thus, the upper section 48 has longitudinally extending flutes 90 which are slidably received in longitudinally extending flutes 92 formed in the lower section 52. Mating engagement between the flutes 90 in the upper section 48 and the flutes 92 in the lower section 52 prevents relative rotation between the upper section 48 and the lower section 52.

Upon rotation of the steering wheel 28, longitudinally extending side surfaces of the flutes 90 in the upper section 48 are pressed against longitudinally extending side surfaces of the flutes 92 in the lower section 52. Therefore, rotational force is transmitted from the flutes 90 in the upper section 48 to the flutes 92 in the lower section 52. This rotational force is transmitted to the lower universal joint 42 and steering gear 26.

In the illustrated embodiment of the invention, the upper section 48 and the lower section 52 are formed of metal and the flutes 90 and 92 are formed as corrugations in the side walls of the generally cylindrical tubular upper and lower sections. However, if desired, the upper and lower sections 48 and 52 could be interconnected to transmit force between the sections in a manner other than by the use of the flutes 90 and 92. For example, the upper and lower sections 48 and 52 could be interconnected by longitudinally extending keys and keyways. Alternatively, the upper and lower sections 48 and 52 could have a polygonal cross sectional configuration. It is contemplated that the upper and lower sections 48 and 52 could be formed with the construction disclosed in U.S. Pat. No. 4,033,020 issued Jul. 5, 1977.

Connector Assembly

The connector assembly 54 interconnects the extension section 50 and the upper section 48 of the shaft assembly 38 in a coaxial relationship. The connector assembly 54 allows the upper section 48 and the extension section 50 to be interconnected only when the output yoke member 60 of the upper universal joint 40 is in a predetermined orientation relative to the input yoke member 78 of the lower universal joint 42.

In the illustrated embodiment of the invention, the connector assembly 54 can interconnect the upper section 48 and extension section 50 of the shaft assembly 38 only when the axis 70 about which the output yoke member 60 of the upper universal joint 40 pivots is parallel to the axis 84 about which the input yoke member 78 of the lower universal joint 42 pivots. This results in the upper section 48 being connected with the extension section 50 only when the upper universal joint 40 and lower universal joint 42 are in a specific phase relationship. Different vehicle designs may require different phase relationships between the universal joints 40 and 42 for optimal performance. For such vehicle designs, the connector assembly 54 could be constructed in such a manner as to interconnect the upper section 48 and extension section 50 when the axes 70 and 84 are in a different orientation relative to each other.

Figure 3:
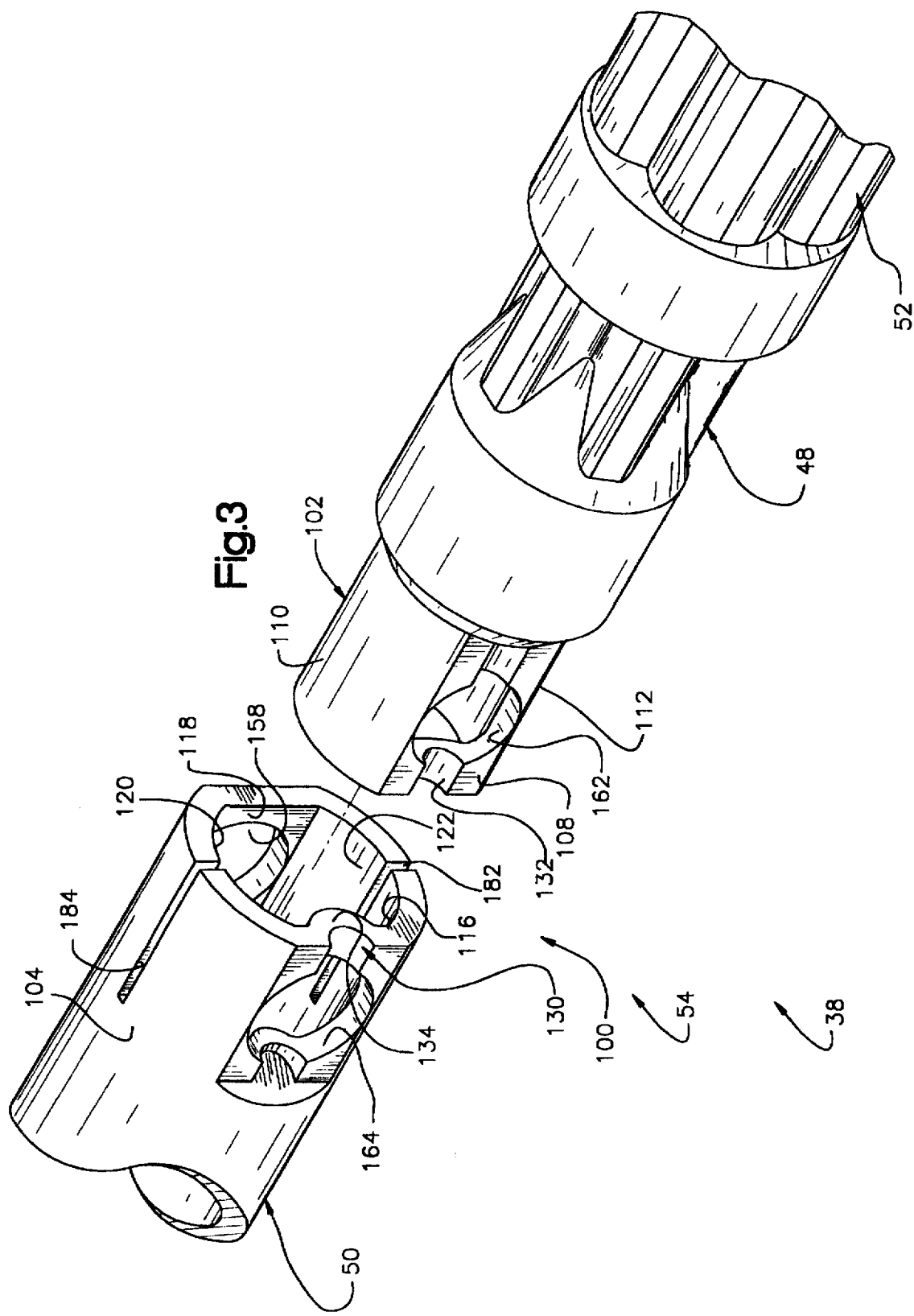
FIG. 3 is an enlarged illustration of end portions of sections of the shaft assembly, the end portions being illustrated in a disconnected condition.

The connector assembly 54 includes a telescopic double D-type connection 100 (FIG. 3) which transmits force between the upper section 48 and the extension section 50 of the shaft assembly 38. The double D-type connection 100 (FIG. 3) is formed by an end portion 102 of the upper section 48 and an end portion 104 of the extension section 50. The end portion 102 of the upper section 48 has a pair of flat parallel outer side surfaces 108 (only one of which is shown in FIG. 3). A pair of arcuate outer side surface areas 110 and 112 extend between straight parallel edges of the outer side surfaces 108. The arcuate outer side surface areas 110 and 112 are longitudinally extending portions of an outer side surface area of a cylinder. The flat outer side surface areas 108 are parallel chords to the cylinder and are disposed on diametrically opposite sides of the end portion 102.

The end portion 104 of the extension section 50 has a pair of flat parallel inner side surface areas 116 and 118. A pair of arcuate inner side surface areas 120 and 122 extend between parallel edge portions of the parallel flat inner side surface areas 116 and 118. The arcuate inner side surface areas 120 and 122 are portions of a cylinder. The arcuate side surface areas 120 and 122 have a diameter which is only slightly greater than the diameter of the arcuate outer side surface areas 110 and 112 on the end portion 102 of the upper section 48.

When the end portion 102 on the upper section 48 is telescopically inserted into the end portion 104 on the extension section 50, the flat outer side surface areas 108 on the end portion 102 are disposed in flat abutting engagement with the inner side surface areas 116 and 118 on the end portion 104 of the extension section 50. When the end portion 102 has been inserted into the end portion 104, the arcuate outer side surface area 110 on the end portion 102 is disposed in engagement with the arcuate inner side surface area 120 on the end portion 104. Similarly, the arcuate outer side surface area 112 on the end portion 102 is disposed in engagement with the arcuate inner side surface area 122 on the end portion 104. The upper section 48 and extension section 50 are interconnected with their longitudinal central axes coincident.

Engagement of the flat outer side surface areas 108 on the upper section 48 with the flat inner side surface areas 116 and 118 on the end portion 104 of the extension section 50 blocks relative rotation between the upper section 48 and extension section 50. Therefore, the flat surface areas 108, 116 and 118 on the end portions 102 and 104 of the upper section 48 and extension section 50 are effective to transmit rotational force from the extension section to the upper section 48 when the steering wheel 28 is rotated.

The flat outer side surface areas 108 on the upper section 48 and the flat inner side surface areas 116 and 118 on the extension section 50 allow the upper section 48 to be connected with the extension section 50 only when the input yoke member 78 of the lower universal joint 42 (FIG. 2) is in a predetermined orientation relative to the output yoke member 60 of the upper universal joint 40. The axis 84 about which the input yoke member 78 pivots extends perpendicular to the parallel planes containing the flat outer side surface areas 108 on the end portion 102 of the upper section 48. The axis 70 about which the output yoke member 60 of the upper universal joint 40 pivots extends perpendicular to the parallel planes containing the flat inner side surface areas 116 and 118 on the extension section 50.

The double D-type connection 104 can be interconnected only when the flat outer side surface areas 108 on the upper section 48 are in abutting engagement with the inner side surface areas 116 and 118 on the extension section 50. Therefore, the end portion 102 on the upper section 48 can be inserted into the end portion 104 on the extension section 50 only when the axes 84 and 70 are parallel.

If an attempt is made to insert the end portion 102 of the upper section 48 into the end portion 104 of the extension section 50 with the axis 84 on the input yoke member 78 of the lower universal joint 42 skewed relative to the axis 70 of the yoke member 60 of the upper universal joint 40, the outer side surface areas 108 on the upper section 48 will be skewed relative to the inner side surface areas 116 and 118 on the extension section 50. Therefore, it would be impossible to insert the end portion 102 on the upper section 48 into the end portion 104 on the extension section 50. This makes certain that the upper universal joint 40 is in phase with the lower universal joint 42 when the upper section 48 is connected with the extension section 50 of the shaft assembly 38.

Although it is preferred that the connection 100 be of the double D-type, it is contemplated that the connection could be of the single D-type. If this was done, the end portion 102 of the upper section 48 would have only a single flat outer side surface 108. Similarly, the end portion 104 of the extension section 50 would only have a single flat inner side surface. However, it is preferred to use the double D-type connection 100 in order to provide a pair of flat force transmitting surface areas on the end portion 102 of the upper section 48 and the end portion 104 of the extension section 50.

It is contemplated that the shaft assembly 38 will be used in association with vehicle steering systems wherein projections from the shaft assembly are used to perform functions when the shaft assembly is in a predetermined orientation relative to the vehicle. These functions could be switch actuation functions. In order to enable projections from the shaft assembly 38 to perform various functions when the shaft assembly is in predetermined rotational positions relative to the vehicle 10, the double D-type connection 100 must be capable of being assembled in only one orientation.

To prevent interconnection of the double D-type connection 100 (FIG. 3) except when the upper section 48 and extension section 50 are in one predetermined orientation relative to each other, the connector assembly 54 includes a blocking surface system 130. The blocking surface system 130 includes a longitudinally extending groove 132 formed in the outer side surface area 108 on the end portion 102 of the upper section 48. The groove 132 has a longitudinal central axis which extends parallel to a longitudinal central axis of the upper section 48. The groove 132 is formed by a semi-circular surface area.

In addition, the blocking surface system 130 includes a rib 134 which extends inwardly from the inner side surface area 116 on the end portion 104 of the extension section 50. The rib 134 has a longitudinal central axis which extends parallel to the longitudinal central axis of the extension section 50. The rib 134 has an outer side surface having a semi-circular configuration. The rib 134 is configured and sized so as to be matingly engageable with the groove 132 upon insertion of the end portion 102 of the upper section 48 into the end portion 104 of the extension section 50.

If an attempt is made to interconnect the upper section 48 with the extension section 50 offset 180° from the position shown in FIG. 3, the rib 134 will not be aligned with the groove 132 and will block insertion of the upper section 48 into the extension section 50. The upper section 48 can be inserted into the extension section 50 only when the groove 132 is axially aligned with the groove 134. This enables the upper section 48 to be connected with the extension section 50 only when they are in a predetermined orientation relative to each other.

It is contemplated that the blocking surface system 130 may be omitted if the shaft assembly 38 is to be used in a vehicle steering system in which the upper section 48 can be connected with the extension section 50 in either one or two orientations. Thus, if it is only necessary to have the upper universal joint 40 in phase with the lower universal joint 42, the blocking surface system 130 could be omitted. This is because the axis 70 about which the output yoke member 60 of the upper universal joint 40 pivots will be parallel to the axis 84 about which the input yoke member 78 of the lower universal joint 42 pivots when the output yoke member 60 is in the orientation shown in FIG. 2 relative to the output yoke member 78. The axis 70 will also be parallel to the axis 84 when the output yoke member 60 is in an orientation which is offset by 180° from the orientation shown in FIG. 2. If desired, the predetermined orientation of the output yoke member 60 of the universal joint 40 relative to the input yoke member 78 of the universal joint 42 could be an orientation in which the axis 70 is skewed at an acute angle relative to the axis 84.

In addition to the double D-type connection 100 (FIG. 3), the connector assembly 54 includes a fastener assembly 140 (FIGS. 4 and 5). The fastener assembly 140 retains the upper section 48 and extension section 50 against axial movement relative to each other.

The fastener assembly 140 includes a bolt 144 having a head end portion 146 and a generally cylindrical body portion 148. A nut 150 has an internal thread convolution which engages an external thread convolution on the body portion 148 of the bolt 144. A cylindrical sleeve 152 encloses the body portion 148 of the bolt 144 and is disposed between the nut 150 and the head end portion 146 of the bolt 144.

When the upper section 48 and extension section 50 are to be interconnected, the bolt 144 is inserted through an opening 158 in the extension section 50 and through an opening 160 in the upper section 48 (FIG. 5). The bolt is then inserted through an opening 162 in the upper section 48 and then through an opening 164 in the extension section 50. The cylindrical sleeve 152 is then inserted around the body portion 148 of the bolt 144. The nut 150 is then threaded onto the body portion 148 of the bolt 144.

As the nut 150 is tightened, a conical swaging surface 170 (FIG. 5) on the nut 150 plastically deforms an end portion 172 of the cylindrical sleeve 152 to an outwardly flaring conical configuration. Simultaneously with the deformation of the end portion 172 of the sleeve, a conical swaging surface 174 on the head end portion 146 of the bolt 144 plastically deforms an end portion 176 of the sleeve 152 to an outwardly flaring conical configuration. The outwardly flaring end portions 172 and 176 of the sleeve 152 grip the extension section 50.

If, for some unforeseen reason, the nut 150 should become disconnected from the bolt 144 and the bolt should fall out of the sleeve 152, the sleeve will retain the upper section 48 and extension section 50 against axial movement relative to each other. Therefore, in the unlikely event that the bolt 144 and nut 150 should become disconnected, the upper section 48 and extension section 50 of the shaft assembly 38 will remain interconnected by the sleeve 152. The upper end portion of the sleeve 152 firmly grips the side of the opening 164 in the extension section 50. The lower end portion 176 of the sleeve firmly grips the side of the opening 158 in the extension section 50.

As the nut 150 is tightened onto the bolt 144 and the end portions 172 and 176 of the sleeve 152 are swaged radially outward to a generally conical configuration, a clamping force is applied against the end portion 104 (FIG. 3) of the extension section 50. This clamping force presses the flat inner side surface areas 116 and 118 on the inside of the extension section 50 against the flat outer side surface areas 108 on the outside of the end portion 102 of the upper section 48. A pair of axially extending slots 182 and 184 (FIGS. 3 and 5) formed in the end portion 104 of the extension section 50 enable the inner side surface areas 116 and 118 (FIG. 3) on the extension section 50 to be pressed firmly against the outer side surface areas 108 on the upper section 48 to provide a tight connection between the lower section and the extension section of the shaft assembly 38.

Assembly of Vehicle

When the vehicle 10 is to be assembled, the base or frame 12 is moved along a lower assembly line. The body 16 is moved along an upper assembly line which is spaced from the lower assembly line. The steering gear 26 is connected with the base 12 while the base is on the lower assembly line. The steering column 34 is connected with the body 16 while the body is on the upper assembly line. At this time, the extension section 50 of the shaft assembly 38 is connected with the steering column 34 by the upper universal joint 40. However, at this time, the variable length portion 46 of the shaft assembly 38 is separate from the steering gear 26.

During assembly of the vehicle 10, the upper conveyor assembly moves the body 16 downward onto the frame 12 on the lower conveyor assembly. After the body 16 has been positioned on the frame 12, the lower universal joint 42 and variable length portion 46 of the shaft assembly 38 are connected with the steering gear 26. The upper section 48 is then connected with the extension section 50.

The end portion 102 of the upper section 48 is telescopically inserted into the end portion 104 of the extension section 50 with the rib 134 aligned with the groove 132 (FIG. 3). After the end portion 102 of the upper section 48 has been inserted into the extension section 50, the bolt 148 is inserted through the openings 158, 160, 162 and 164 in the end portions 102 and 104 of the upper section 48 and extension section 50. The cylindrical sleeve 152 is inserted through the openings 158–164. The nut 150 is then tightened onto the bolt 144. As the nut 150 is tightened, an axially directed force is applied against the sleeve 152. The axial force applied against the sleeve 152 by the nut 150 and head end portion 146 of the bolt 144 results in the end portions 172 and 176 of the sleeve being plastically deformed radially outward to firmly grip the extension section 50.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in transmitting force between a steering gear which is mounted on a base of a vehicle and is operable to turn steerable vehicle wheels and a steering wheel which is disposed in a passenger compartment which is movable relative to the base of the vehicle, said apparatus comprising:

a lower universal joint connected with the steering gear;

an upper universal joint connected with the steering wheel, said upper universal joint being movable relative to said lower universal joint upon relative movement between the steering wheel and base of the vehicle;

a variable length shaft assembly extending between said upper and lower universal joints, said variable length shaft assembly including, first and second sections disposed in a telescopic relationship and connected with a first one of said universal joints, said first and second sections of said shaft assembly being relatively movable to vary the extent of the telescopic relationship between said first and second sections and the length of said shaft assembly to accommodate relative movement between the steering wheel and base of the vehicle, an extension section connected with a second one of said universal joints, and connector means for connecting said extension section with said first section of said shaft assembly, said connector means including means for blocking interconnection of said extension section and said first section of said shaft assembly when said upper and lower universal joints are in an orientation other than a desired orientation relative to each other, said connector means including a longitudinally extending groove formed in one of said extension section and said first section of said shaft assembly and a longitudinally extending projection formed in the other of said extension section and said first section of said shaft assembly, said projection and said groove having longitudinal axes which extend parallel to longitudinal axes of said extension section and said first section of said shaft assembly, said projection and said groove cooperating to block interconnection of said extension section and said first section of said shaft assembly when said upper and lower universal joints are in an orientation other than a desired orientation relative to each other.

2. An apparatus as set forth in claim 1 wherein said lower universal joint includes a first member connected with the steering gear and a second member connected with said shaft assembly, said second member being pivotal relative to said first member about a first axis, said upper universal joint including a third member connected with the steering wheel and a fourth member connected with said shaft assembly, said fourth member being pivotal relative to said third member about a second axis, said blocking means blocking connection of said extension section with said first section of said shaft assembly when said first and second axes are in a relationship other than a parallel relationship.

3. An apparatus as set forth in claim 1 wherein said connector means includes a sleeve which extends through said extension section and said first section of said shaft assembly and means for deforming an end portion of said sleeve upon connection of said extension section with said first section of said shaft assembly.

4. An apparatus as set forth in claim 1 wherein said connector means includes a flat side surface area and an arcuate side surface area which are disposed on said first section of said shaft assembly, said arcuate side surface area extends away from at least one edge portion of said flat side surface area, and a flat side surface area and an arcuate side surface area which are disposed on said extension section, said arcuate side surface area on said extension section extends away from at least one edge portion of said flat side surface area on said extension section, said flat side surface area on said extension section being disposed in engagement with said flat side surface area on said first section of said shaft assembly.

5. An apparatus as set forth in claim 1 wherein said upper universal joint connects said extension section with the steering wheel and said lower universal joint connects said second section of said shaft assembly with the steering gear.

6. An apparatus as set forth in claim 1 wherein said connector means includes first and second flat side surface areas and first and second arcuate side surface areas which are disposed on said first section of said shaft assembly, and third and fourth flat side surface areas and third and fourth arcuate side surface areas which are disposed on said extension section, said first and third flat side surface areas being disposed in engagement and said second and fourth flat side surface areas being disposed in engagement.

7. An apparatus as set forth in claim 6 wherein said connector means further includes a fastener which extends through said first, second, third and fourth flat side surface areas and a sleeve which extends around a portion of said fastener, said sleeve having a first outwardly flaring end portion which is disposed adjacent to said first and third flat side surface areas and a second outwardly flaring end portion which is disposed adjacent to said second and fourth flat side surface areas.

8. An apparatus for use in transmitting force between a steering gear which is mounted on a base of a vehicle and is operable to turn steerable vehicle wheels and a steering wheel which is disposed in a passenger compartment, said apparatus comprising:

a lower universal joint connected with the steering gear;

an upper universal joint connected with the steering wheel;

a shaft assembly extending between said upper and lower universal joints, said shaft assembly having first and second sections, said first section of said shaft assembly having an end portion in which an end portion of said second section of said shaft assembly is received;

a bolt extending through said end portions of said first and second sections of said shaft assembly, said bolt having a threaded end portion and a head end portion;

a nut disposed in engagement with said threaded end portion of said bolt; and a sleeve enclosing at least a portion of said bolt, said head end portion of said bolt including surface means for plastically and permanently deforming a first end portion of said sleeve, said nut including surface means for plastically and permanently deforming a second end portion of said sleeve, said first and second end portions of said sleeve cooperating with said end portions of said first and second sections of said shaft assembly to retain said end portion of said second section of said shaft in said end portion of said first section of said shaft and to enable force to be transmitted between the steering wheel and the steering gear in the event said nut becomes disconnected from the threaded end portion of said bolt.

9. An apparatus as set forth in claim 8 wherein said shaft assembly including a third section which is disposed in a telescopic relationship with one of said first and second sections of said shaft assembly, said third section and said one of said first and second sections of said shaft assembly being relatively movable to vary the extent of the telescopic relationship between said third section and said one of said first and second sections of said shaft assembly to accommodate relative movement between the steering wheel and base of the vehicle.

10. An apparatus as set forth in claim 8 wherein said end portion of said first section of said shaft assembly includes a flat inner side surface area and an arcuate inner side surface area which extends away from said flat inner side surface area, said end portion of said second section of said shaft assembly having a flat outer side surface area and an arcuate outer side surface area which extends away from said flat outer side surface area, said flat inner side surface area on said end portion of said first section of said shaft assembly being disposed in engagement with said flat outer side surface on said end portion of said second section of said shaft assembly, said sleeve and said bolt extending through an opening formed in said flat outer side surface on said end portion of said second section of said shaft assembly and through an opening formed in said flat inner side surface on said end portion of said first section of said shaft assembly.

11. An apparatus as set forth in claim 8 wherein said lower universal joint includes a first member connected with the steering gear and a second member connected with said shaft assembly, said second member being pivotal relative to said first member about a first axis, said upper universal joint including a third member connected with the steering wheel and a fourth member connected with said shaft assembly, said fourth member being pivotal relative to said third member about a second axis, said end portions of said first and second sections of said shaft assembly including means for blocking insertion of said end portion of said second section of said shaft assembly into said end portion of said first section of said shaft assembly when said first and second axes are in a relationship other than a parallel relationship.

* * * * *